(12) United States Patent
Bruggeman

(10) Patent No.: US 10,492,506 B2
(45) Date of Patent: Dec. 3, 2019

(54) FISH FILLET BOARD AND METHOD OF USE

(71) Applicant: Edward Gabriels, Germantown, NY (US)

(72) Inventor: Kimber Bruggeman, Germantown, NY (US)

( * ) Notice: Subject to any disclaimer, the term of this patent is extended or adjusted under 35 U.S.C. 154(b) by 0 days.

(21) Appl. No.: 16/317,339

(22) PCT Filed: Aug. 3, 2017

(86) PCT No.: PCT/US2017/045392
§ 371 (c)(1),
(2) Date: Jan. 11, 2019

(87) PCT Pub. No.: WO2018/027086
PCT Pub. Date: Feb. 8, 2018

(65) Prior Publication Data
US 2019/0289863 A1    Sep. 26, 2019

Related U.S. Application Data

(60) Provisional application No. 62/370,802, filed on Aug. 4, 2016.

(51) Int. Cl.
*A22C 25/00* (2006.01)
*A22C 25/16* (2006.01)
*A22C 25/06* (2006.01)

(52) U.S. Cl.
CPC .............. *A22C 25/16* (2013.01); *A22C 25/06* (2013.01)

(58) Field of Classification Search
CPC ....... A22C 25/00; A22C 25/006; A22C 25/02; A22C 25/025; A22C 25/16
USPC ......................................... 452/185, 194–196
See application file for complete search history.

(56) References Cited

U.S. PATENT DOCUMENTS

| 2,725,592 A | 12/1955 | Pieper |
| 2,816,588 A * | 12/1957 | Miron ................... A47J 47/005 83/761 |
| 2,913,760 A | 11/1959 | Engle, Jr. |
| 3,177,523 A | 4/1965 | Andersen |
| 3,248,751 A | 5/1966 | Wilborn |

(Continued)

OTHER PUBLICATIONS

Rapala Poly Fillet Board with Clamp. https://www.amazon.com/Rapala-Poly-Fillet-Board-Clamp/dp/B007R4ROFG/ref=sr_1_1?ie=UTF8&qid=1547225479&sr=8-1&keywords=rapala+poly+fillet+board+with+clamp.

(Continued)

*Primary Examiner* — Richard T Price, Jr.
(74) *Attorney, Agent, or Firm* — Mitchell J. W. Vap; Haffey Vap PLLC

(57) ABSTRACT

Many different designs of fillet boards exist in the related art. One problem associated with processing fish is the problem of keeping a fish in a stable position to execute fillet cuts. The subject invention is an improved Fish Fillet Board and Method of Use. The subject invention relates to the field of fishing and fish processing. The subject invention utilizes a gill bracket, which secures a fish in proper position for the user to execute the first side fillet cut. Once the first side fillet cut is completed, the user then positions the appropriate number of spacers to level the fish for the second side fillet cut. Levelling of the fish significantly decreases the difficulty of the second side fillet cut, and decreases the potential of wasted meat due to an inaccurate fillet cut.

21 Claims, 6 Drawing Sheets

(56) References Cited

U.S. PATENT DOCUMENTS

| | | | |
|---|---|---|---|
| 3,605,839 A | 9/1971 | Gerson | |
| 4,485,527 A | 12/1984 | Stachowiak | |
| D352,427 S | 11/1994 | Burd | |
| 5,522,765 A * | 6/1996 | Dotson | A22C 25/06 452/194 |
| 5,628,681 A | 5/1997 | White et al. | |
| 6,942,562 B2 * | 9/2005 | Kallas | A22C 25/06 452/195 |
| 7,674,163 B2 * | 3/2010 | Howard | A22C 25/06 452/194 |
| 8,376,816 B2 | 2/2013 | Redford et al. | |

OTHER PUBLICATIONS

Bass Pro Shops Hardwood Fillet Board. https://www.basspro.com/shop/en/bass-pro-shops-hardwood-fillet-board.

* cited by examiner

FISH FILLET BOARD AND METHOD OF USE

CROSS-REFERENCE TO RELATED APPLICATIONS

This application claims the benefits of U.S. Provisional Application No. 62/370,802, filed on Aug. 4, 2016, the disclosures of which are hereby incorporated by reference in their entirety including all figures, tables, and drawings.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND OF THE INVENTION

1. Field of the Invention

Herein described is an improved Fish Fillet Board and Method of Use. The embodiments disclosed herein relate to the field of fishing and fish processing. The embodiments disclosed herein disclose a gill bracket, which is utilized to secure a fish in proper position for the user to execute the first side fillet cut. Once the first side fillet cut is completed, the user then positions the appropriate number of ¼ inch spacers to level the fish for the second side fillet cut. Levelling of the fish significantly decreases the difficulty of the second side fillet cut, and decreases the potential of wasted meat due to an inaccurate fillet cut.

2. Description of Related Art

Many different designs of fillet boards exist in the related art. One problem associated with processing fish is the problem of keeping a fish in a stable position to execute fillet cuts. Various fillet boards have attempted to solve this problem by utilizing clamps to grasp onto either the head or tail section of a fish during processing to resist the longitudinal forces created during a fillet cut, i.e. keep the fish from sliding off the board. Problems still exist with fillet boards that utilize clamping means to keep a fish in place. First, it is known that the longitudinal force created during a fillet cut, coupled with decreased friction between the clamping means and a fish's protective mucous coating can cause certain fish to slip out of the clamp, thus disrupting the fillet cut, and potentially creating a condition where a user is exerting force through a fillet knife at the time the fish releases from the clamping mechanism. Second, clamping mechanisms only provide stability to counteract the force of the fillet knife moving through the fish. Such clamping mechanisms do not provide any stability perpendicular to the direction of travel of the fillet knife. Thus, the clamping mechanisms generally provide no stability to counteract any "sawing" motion of the fillet knife, which could result in perpendicular movement of the fish during filleting. Third, use of clamp mechanism fillet boards requires the user to set down the fillet knife in order to operate the clamp mechanism with one hand, and position the fish with the other, thus increasing the amount of movements required during fish processing. Lastly, clamp mechanism boards include no means of levelling a fish that has been filleted on one side for easy, non-wasteful filleting on the second side.

Another problem associated with processing fish is associated with the difficulty and wastefulness of the second fillet cut. As noted above, clamp mechanism boards have no means of levelling the fish's spine for the second fillet cut. As such, a significant portion of useable meat is generally wasted when the processor attempts to find the fish spine with his or her fillet knife to follow for the second longitudinal fillet cut. Other fillet boards have attempted to address this problem by including a recess in the bottom portion of the board for the head portion of a fish that has been processed on one side to rest in for completion of the second side fillet cut. These designs generally include an undercut edge, which is designed to engage the previously processed fish behind the gill portion of the first fillet cut, which stabilizes the fish during the second fillet cut. However, problems still exist with these recessed designs. First, these recessed designs provide no means of stabilizing the fish during the first fillet cut. Seating the fish within the recess for the first cut would result in a convex un-levelling of the fish's spine, and associated waste during the first cut. Second, these recessed designs are not adjustable regarding the size and thickness of the fish being processed. Therefore, any head portion of a fish that is too large or too small to properly seat within the recess, will cause the fish to be un-level and/or impact the stability of the fish during the second fillet cut. A fish that is too large for the recess will result in an un-level, concavely curved spine, and associated waste. A fish that is too small to properly seat in the bottom of the recessed area will decrease the stability of the fish during processing because downward pressure exerted by the non-fillet knife hand will cause the head portion of the fish to further seat within the recess. This would result in a convexly curved spine, which would increase the difficulty of the second cut, and lead to excess waste.

3. Object of the Present Invention

Due to the problems discussed above, there remains a need for an improved Fish Fillet Board in the industry. The objectives of the present invention are to: (1) provide a Fish Fillet Board that accommodates different sizes of fish for processing; (2) that provides stability of the fish during all phases of processing; (3) where engaging the fish with the board can be accomplished with one hand; and (4) where leveling of the fish during the second fillet cut significantly decreases the difficulty of the second fillet cut, and eliminates waste.

SUMMARY OF THE INVENTION

The present invention solves the problems stated above. The herein described Fish Fillet Board is comprised of a baseboard and stackable spacers made of HDPE food grade plastic. Affixed to each baseboard is a gill bracket, which engages the gill plate of the fish during the first fillet cut to provide both longitudinal and perpendicular stability during the cut. The 60-degree angle of the gill bracket engages the gill plate of the fish in a manner to securely hold the fish in place during the first fillet cut, and minimize both longitudinal and perpendicular movement of the fish during processing. The user can easily position a fish on the gill bracket with one hand, which reduces the overall movements required to process the fish. Once the fish is positioned on the gill bracket, the user completes the first side fillet cut. Once the first side fillet cut is complete, the partially processed fish can then be removed and further fish can be placed for completing the first side fillet cut.

Once all first side fillet cuts have been completed, the user configures the Fish Fillet Board for the second side fillet cut. The user selects the appropriate number of spacers to apply to the baseboard support posts, which will accommodate the size of fish being processed. The filleted side of the fish is placed down so that the head portion of the fish seats within the area created by the cut out portion of the stackable spacers. The stackable spacers function to perfectly level the spine of the fish so that the user can make a precise second fillet cut along the full distance of the fish's spine to prevent any waste due to convex or concave curvature of the spine. The edge of the cut out portion of the stackable spacers engages the perpendicular cut of the first side behind the gill area of the fish to provide both longitudinal and perpendicular stability of the fish during the second side fillet cut. Proper seating of the head portion within the recessed area allows for the user to exert hand pressure down on the head for added support without curving the fish's spine. Thus, the present invention solves the problems identified in the related art.

DETAILED DESCRIPTION OF THE PREFERRED EMBODIMENTS

Although only two embodiments are explained in detail, the figures and specifications should be understood as illustrations only, and are not intended to limit the invention in its scope. Also, in describing the embodiments, specific terminology may be used, but it should be understood that specific terms include all technical equivalents that operate in similar manners to accomplish similar purposes.

Figure 1:
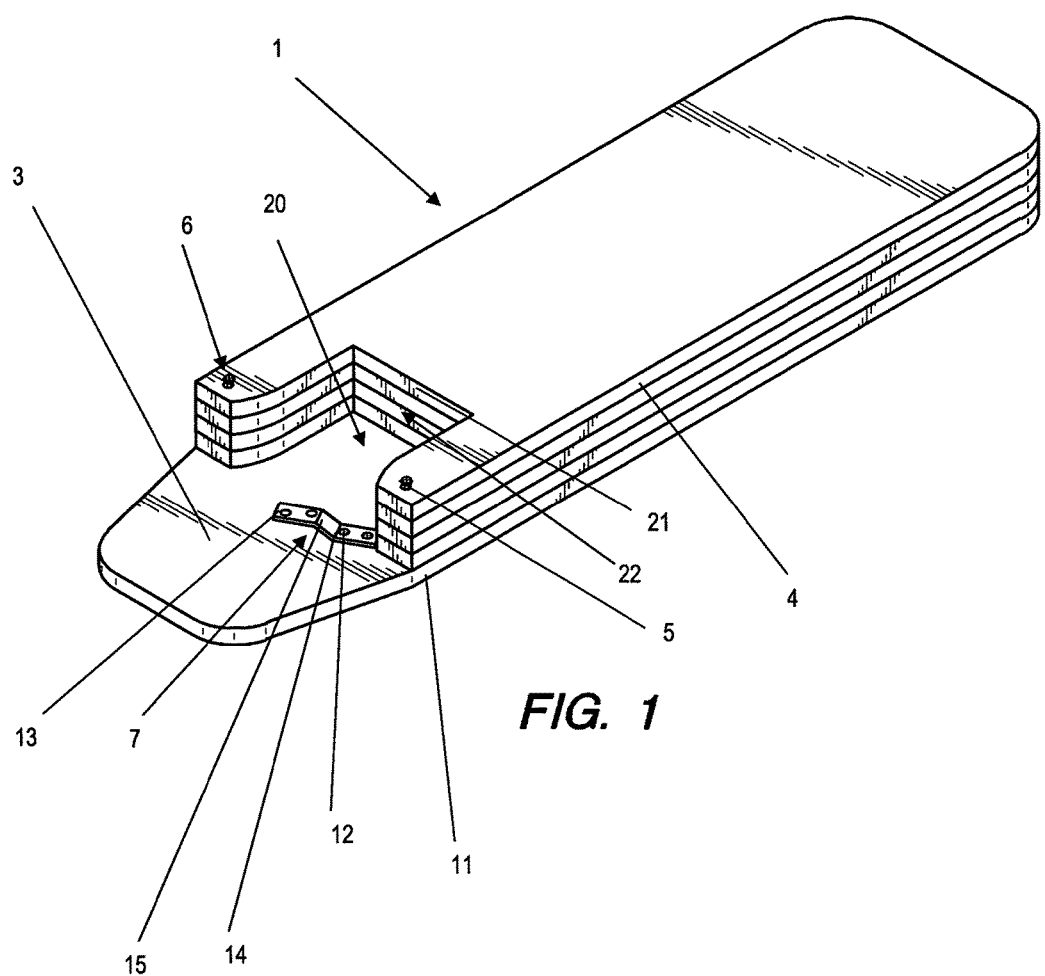
FIG. 1—Perspective view of compact version of Fish Fillet Board with all spacers stacked.
Figure 2:
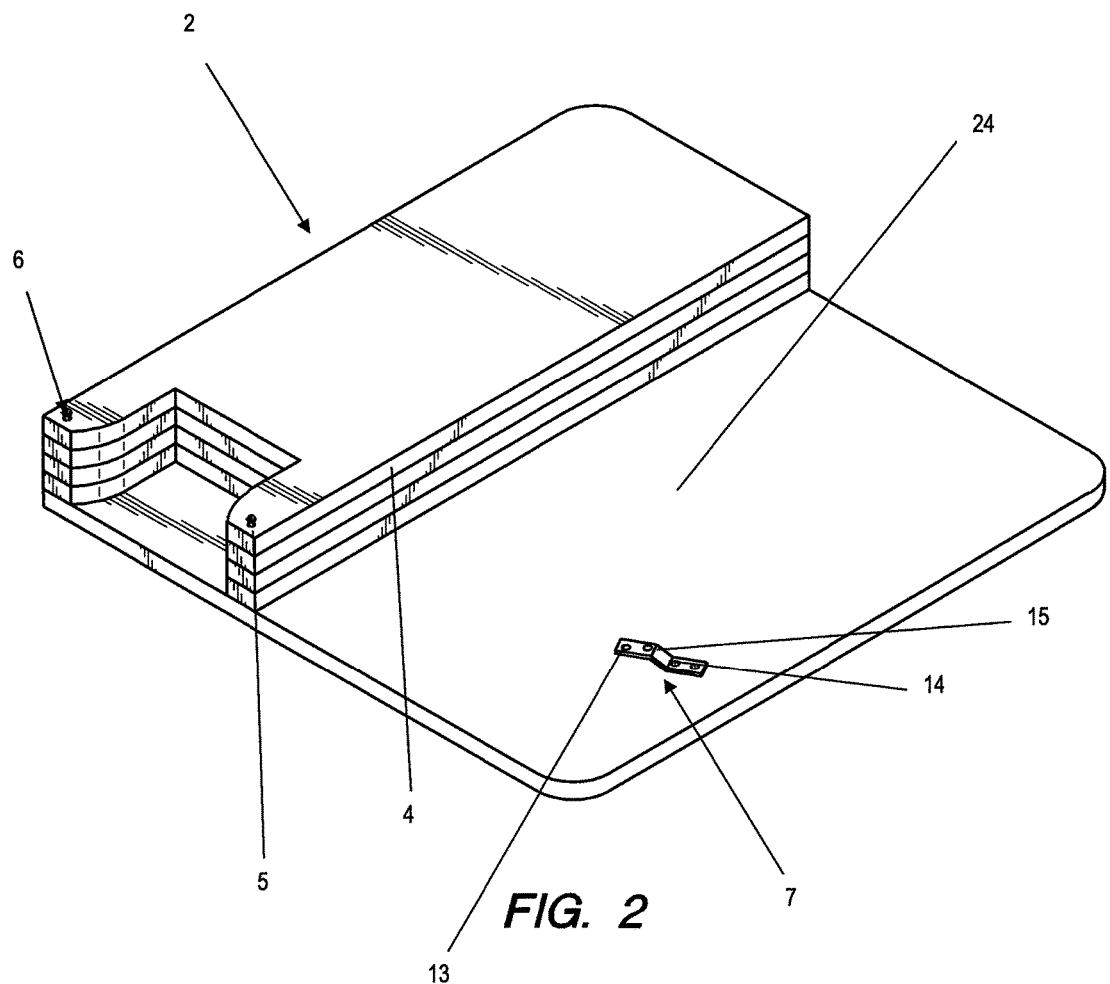
FIG. 2—Perspective view of full size version of Fish Fillet Board with all spacers stacked.
Figure 3:
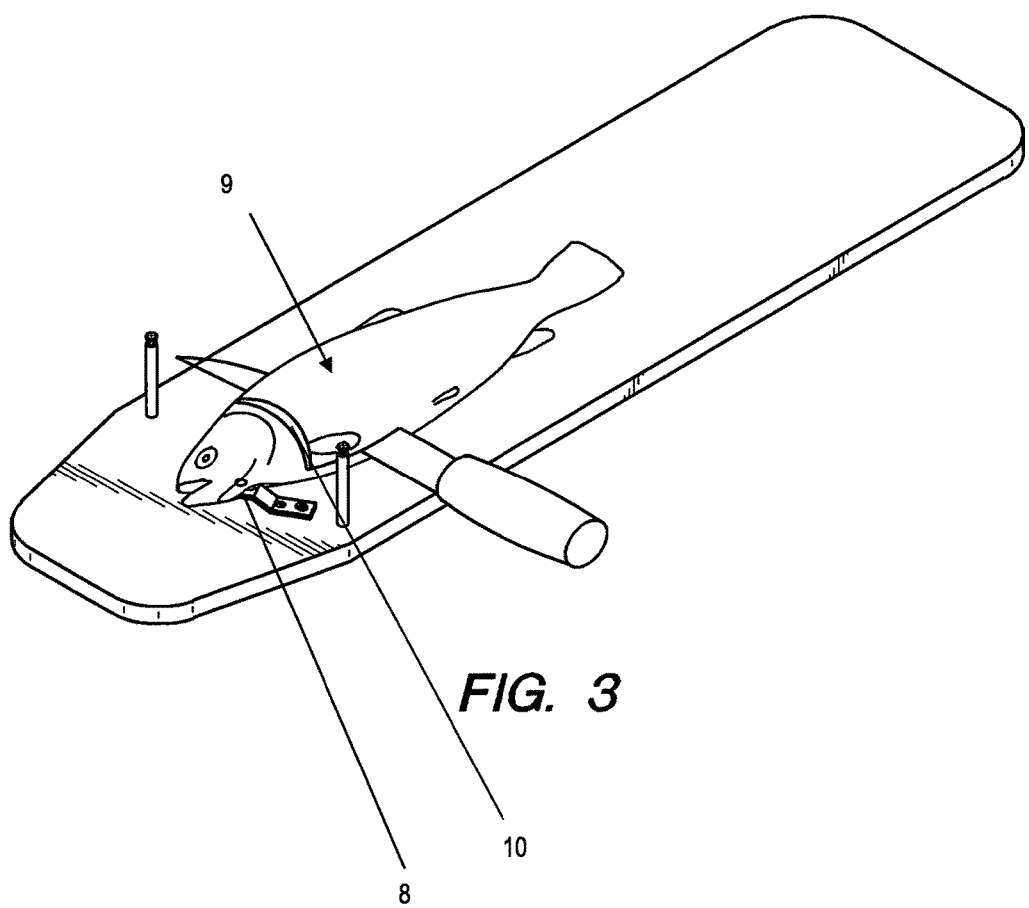
FIG. 3—Perspective view of compact version of Fish Fillet Board, spacers removed, with fish secured by gill bracket, user completing first side fillet cut.
Figure 4:
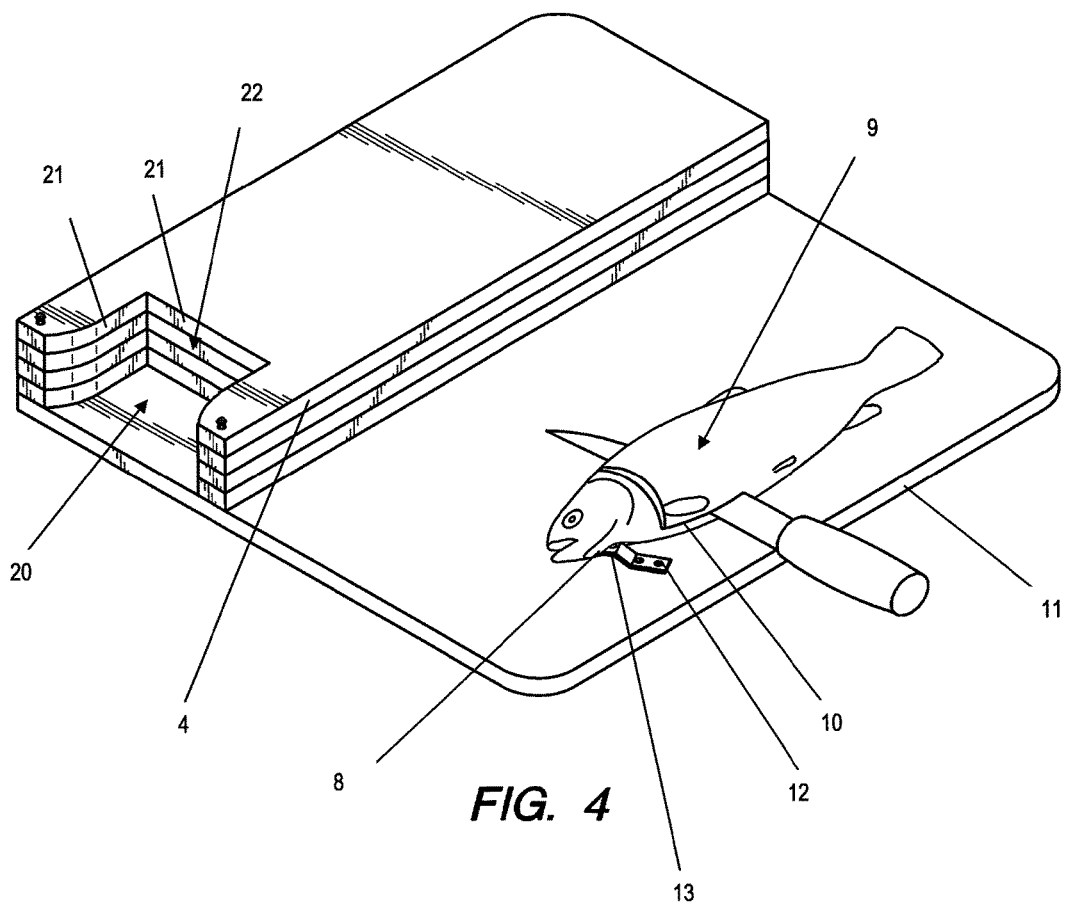
FIG. 4—Perspective view of full size version of Fish Fillet Board with fish secured by gill bracket, user completing first side fillet cut.
Figure 5:
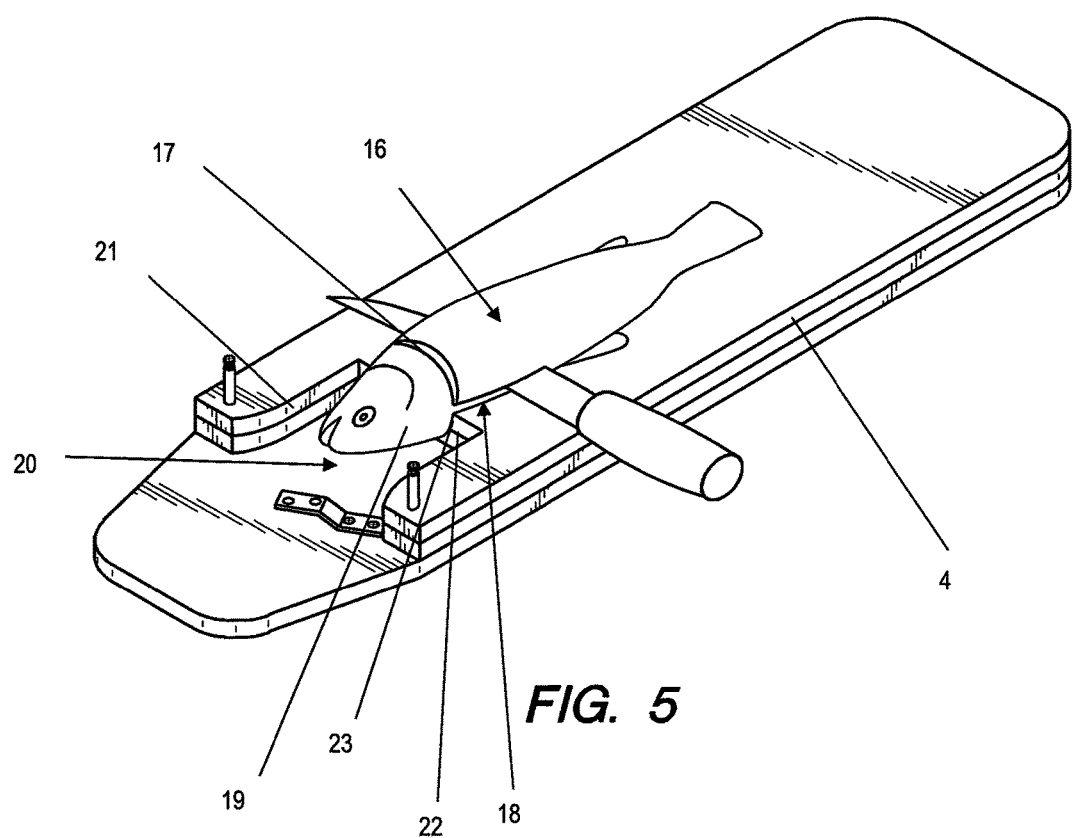
FIG. 5—Perspective view of compact version of Fish Fillet Board, two spacers stacked, head portion of fish seated properly in recess created by spacers to level fish spine, user completing second fillet cut.

With reference to the drawings, a preferred embodiment of the Fish Fillet Board 1 is illustrated in the attached drawings, FIGS. 1, 3, and 5. The Fish Fillet Board 1 is a compact version of the invention. A full-sized version of the Fish Fillet Board 2 is illustrated in the attached drawings FIGS. 2, 4, and 6. Both embodiments are further detailed below.

The herein described Fish Fillet Board 1 is comprised of a baseboard 3 and ¼ inch thick stackable spacers 4 made of HDPE food grade plastic. While the embodiments described herein are comprised of ¼ inch stackable spacers, one skilled in the art would recognize that varying amounts of spacers of varying widths could be utilized to accomplish the subject invention's objectives. In other embodiments of the invention, spacers with a thickness of ⅜ inch are utilized. Said ¼ inch thick stackable spacers 4 are applied to the baseboard 3 by lining up the two holes 5 in each ¼ inch thick stackable spacer 4 with the two 1¼ inch support posts 6 of the base board 3. While the embodiments described herein are comprised of 1¼ inch support posts, one skilled in the art would recognize that support posts of varying lengths could be utilized to accomplish the subject invention's objectives. In other embodiments of the invention, the support post length is 1 inch. Affixed to each baseboard 3 is a gill bracket 7, which engages the gill plate 8 of the fish 9 during the first fillet cut 10 to provide both longitudinal and perpendicular stability during the cut. The gill bracket 7 is angled 60 degrees from the user side edge 11 of the baseboard 3 to engage the gill plate 8 of the fish 9 in a manner to securely hold the fish 9 in place during the first fillet cut 10 as depicted in FIG. 3.

The user can easily position a fish 9 on the gill bracket 7 with one hand, which reduces the overall movements required to process the fish 9. The gill bracket 7 is affixed to the baseboard 3 by standard fastening means such as screws 12. The gill plate 8 engaging portion 13 of the gill bracket 7 is slightly elevated above the top of the baseboard 3 to facilitate placement of the fish 9 on the gill bracket 7. The gill plate 8 engaging portion 13 elevation is accomplished by one 45-degree bend upward bend 14 and one 45-degree downward bend 15 of the gill bracket 7.

Once the fish 9 is positioned on the gill bracket 7, the user completes the first side fillet cut 10. Once the first side fillet cut 10 is complete, the partially processed fish 16 can then be removed and further fish can be placed for completing the first side fillet cut.

Once all first side fillet cuts have been completed, the user configures the Fish Fillet Board 1 for the second side fillet cut 17 as shown in FIG. 5. The user selects the appropriate number of ¼ inch stackable spacers 4 to apply to the baseboard 3 support posts 6, which will accommodate the size of the partially processed fish 16. The filleted side 18 of the partially processed fish 16 is placed down so that the head portion 19 of the partially processed fish 16 seats within the recessed area 20 created by the cut out portion 21 of the ¼ inch stackable spacers 4. The ¼ inch stackable spacers 4 function to perfectly level the spine of the partially processed fish 16 so that the user can make a precise second fillet cut 17 along the full distance of the fish's spine to prevent any waste due to convex or concave curvature of the spine. The edge 22 created by the cut out portion 21 of the ¼" stackable spacers engages the perpendicular cut 23 of the first side behind the gill area of fish. Proper seating of the head portion 19 within the recessed area 20 allows for the user to exert hand pressure down on the head portion 19 for added support without curving the fish's spine. Thus, the present invention solves the problems identified in the related art.

The herein described Fish Fillet Board 2 is comprised of a baseboard 24 and ¼ inch thick stackable spacers 4 made of HDPE food grade plastic. Said ¼ inch thick stackable spacers 4 are applied to the baseboard 24 by lining up the two holes 5 in each ¼ inch thick stackable spacer 4 with the two 1¼ inch support posts 6 of the baseboard 24. Affixed to each baseboard 24 is a gill bracket 7, which engages the gill plate 8 of the fish 9 during the first fillet cut 10 to provide both longitudinal and perpendicular stability during the cut. The gill bracket 7 is angled 60 degrees from the user side edge 11 of the baseboard 24 to engage the gill plate 8 of the fish 9 in a manner to securely hold the fish 9 in place during the first fillet cut 10 as depicted in FIG. 4.

The user can easily position a fish 9 on the gill bracket 7 with one hand, which reduces the overall movements required to process the fish 9. The gill bracket 7 is affixed to the baseboard 24 by standard fastening means such as screws 12. The gill plate 8 engaging portion 13 of the gill bracket 7 is slightly elevated above the top of the baseboard 24 to facilitate placement of the fish 9 on the gill bracket 7. The gill plate 8 engaging portion 13 elevation is accomplished by one 45-degree bend upward bend 14 and one 45-degree downward bend 15 of the gill bracket 7.

Once the fish 9 is positioned on the gill bracket 7, the user completes the first side fillet cut 10. Once the first side fillet cut 10 is complete, the partially processed fish 16 can then be removed and further fish can be placed for completing the first side fillet cut.

Figure 6:
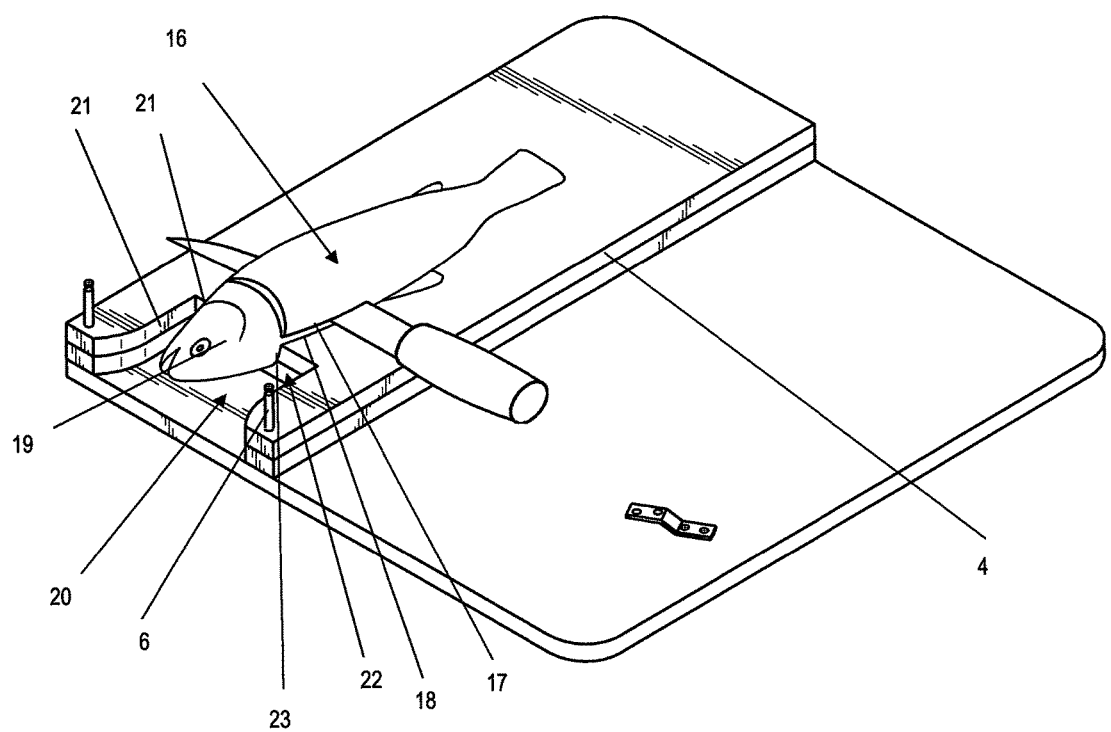
FIG. 6—Perspective view of full version of Fish Fillet Board, two spacers stacked, head portion of fish seated properly in recess created by spacers to level fish spine, user completing second fillet cut.

The Fish Fillet Board 2 can be configured for the second side fillet cut 17 at the outset of use, or after all first side fillet cuts 10 have been completed. This is possible due to the full size baseboard 24, and the gill bracket 7 positioned away from the ¼ inch stackable spacers 4. The user configures the Fish Fillet Board 2 for the second side fillet cut 17 as shown in FIG. 6. The user selects the appropriate number of ¼ inch stackable spacers 4 to apply to the baseboard 24 1¼ support posts 6, which will accommodate the size of the partially processed fish 16. The filleted side 18 of the partially processed fish 16 is placed down so that the head portion 19 of the partially processed fish 16 seats within the recessed area 20 created by the cut out portion 21 of the ¼ inch stackable spacers 4. The ¼ inch stackable spacers 4 function to perfectly level the spine of the partially processed fish 16 so that the user can make a precise second fillet cut 17 along the full distance of the fish's spine to prevent any waste due to convex or concave curvature of the spine. The edge 22 created by the cut out portion 21 of the ¼" stackable spacers engages the perpendicular cut 23 of the first side behind the gill area of fish. Proper seating of the head portion 19 within the recessed area 20 allows for the user to exert hand pressure down on the head portion 19 for added support without curving the fish's spine. Thus, the present invention solves the problems identified in the related art.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein.

I claim:
1. A Fish Fillet Board comprised of:
 a. a baseboard with a plurality of support posts;
 b. a plurality of stackable spacers;
 c. where said stackable spacers have holes, which correspond to said support posts; and
 d. a gill bracket affixed to said baseboard by a securing device.
2. The Fish Fillet Board of claim 1 where said baseboard is comprised of HDPE food grade plastic.
3. The Fish Fillet Board of claim 1 where said spacers are comprised of HDPE food grade plastic.
4. The Fish Fillet Board of claim 1 where said spacers are ¼ inch thick.
5. The Fish Fillet Board of claim 1 where said plurality of support posts is comprised of two support posts.
6. The Fish Fillet Board of claim 5 where said support posts are 1¼ inches in length.
7. The Fish Fillet Board of claim 1 where said gill bracket is angled 60 degrees from the user side edge of said baseboard.
8. The Fish Fillet Board of claim 7 where a fish engaging portion of said gill bracket is elevated from the top of said baseboard.
9. The Fish Fillet Board of claim 8 where the elevation of said fish engaging portion of said gill bracket is accomplished by one 45 degree bend upward, and one 45 degree bend downward of said gill bracket.
10. The Fish Fillet Board of claim 1 where said spacers are further comprised of a cut out portion at one end to form a recess, which accepts the partially processed fish's head portion.
11. The Fish Fillet Board of claim 1 where said baseboard and said spacers are the same width.
12. The Fish Fillet Board of claim 1 where said baseboard is wider than said spacers so that a first fillet cut can be accomplished without removing said spacers from said baseboard.
13. The Fish Fillet Board of claim 1 where said spacers are ⅜ inch thick.
14. The Fish Fillet Board of claim 1 where said support posts are 1 inch in length.
15. A Fish Fillet Board comprised of:
 a. a baseboard with a plurality of 1¼ inch support posts;
 b. a plurality of ¼ inch thick stackable spacers;
 c. where said baseboard and spacers are comprised of HDPE food grade plastic;
 d. where said stackable spacers have holes, which correspond to said support posts; and
 e. said stackable spacers are further comprised of a cut out portion at one end to form a recess, which accepts a partially processed fish's head portion;
 e. a gill bracket affixed to said baseboard by a securing device;
 f. where said gill bracket is angled 60 degrees from an user side edge of said baseboard; and
 g. a fish engaging portion of said gill bracket is elevated from the top of said baseboard by one 45 degree bend upward, and one 45 degree bend downward of said gill bracket.
16. The Fish Fillet Board of claim 15 where said baseboard and said spacers are the same width.
17. The Fish Fillet Board of claim 15 where said baseboard is wider than said spacers so that a first fillet cut can be accomplished without removing said spacers from said baseboard.
18. A Fish Fillet Board comprised of:
 a. a baseboard with a plurality of 1 inch support posts;
 b. a plurality of ⅜ inch thick stackable spacers;

c. where said baseboard and said spacers are comprised of HDPE food grade plastic;

d. where said stackable spacers have holes, which correspond to said support posts; and e. said stackable spacers are further comprised of a cut out portion at one end to form a recess, which accepts a partially processed fish's head portion;

e. a gill bracket affixed to said baseboard by a securing device;

f. where said gill bracket is angled 60 degrees from the user side edge of said baseboard; and g. a fish engaging portion of said gill bracket is elevated from the top of said baseboard by one 45 degree bend upward, and one 45 degree bend downward of said gill bracket.

19. The Fish Fillet Board of claim 18 where said baseboard and said spacers are the same width.

20. The Fish Fillet Board of claim 18 where said baseboard is wider than said spacers so that a first fillet cut can be accomplished without removing said spacers from said baseboard.

21. A method for processing a fish comprising:

a. placing a fish on a baseboard and engaging the fish with an affixed gill bracket;

b. executing a first side fillet cut;

c. selecting an appropriate number of stackable spacers to apply to said baseboard, which act to level the fish's spine prior to the second fillet cut;

d. where said stackable spacers are comprised of a cut out portion at one end to form a recess, which accepts the partially processed fish's head portion;

e. placing the partially processed fish on said stackable spacers, processed side down, where the head portion of said fish rests in said recess created by said cut out portion of said stackable spacers; and f. executing a second side fillet cut.

* * * * *